United States Patent
Dinulescu

(10) Patent No.: US 10,054,374 B2
(45) Date of Patent: Aug. 21, 2018

(54) HEAT TRANSFER CELL FOR HEAT EXCHANGER AND ASSEMBLY, AND METHODS OF FABRICATING THE SAME

(71) Applicant: EURO-APEX B.V., Voorburg (NL)

(72) Inventor: Mircea Dinulescu, Voorburg (NL)

(73) Assignee: EURO-APEX B.V., Voorburg (NL)

( * ) Notice: Subject to any disclaimer, the term of this patent is extended or adjusted under 35 U.S.C. 154(b) by 595 days.

(21) Appl. No.: 14/524,328

(22) Filed: Oct. 27, 2014

(65) Prior Publication Data

US 2015/0107809 A1    Apr. 23, 2015

Related U.S. Application Data

(63) Continuation of application No. 12/499,956, filed on Jul. 9, 2009, now abandoned.

(30) Foreign Application Priority Data

Jul. 9, 2008  (KR) .................. 10-2008-0066435

(51) Int. Cl.

| | |
|---|---|
| F28D 7/02 | (2006.01) |
| F28F 3/00 | (2006.01) |
| F28F 3/10 | (2006.01) |
| F28D 9/00 | (2006.01) |
| F28F 1/00 | (2006.01) |
| F28F 1/04 | (2006.01) |

(Continued)

(52) U.S. Cl.
CPC ............... *F28F 3/10* (2013.01); *B23P 15/26* (2013.01); *F28D 9/0037* (2013.01); *F28F 1/006* (2013.01); *F28F 1/045* (2013.01); *F28F 19/00* (2013.01); *F28F 2275/06* (2013.01); *Y10T 29/4935* (2015.01); *Y10T 29/49366* (2015.01)

(58) Field of Classification Search
CPC .... F28F 3/10; F28F 1/006; F28F 1/045; F28F 19/00; F28F 9/0037; B23P 15/26
USPC ......................................... 165/166, 164, 165
See application file for complete search history.

(56) References Cited

U.S. PATENT DOCUMENTS 4,179,781 A * 12/1979 Long .................... B21D 53/04
                                                            165/166
4,384,611 A *  5/1983 Fung .................... F28D 9/0025
                                                            165/166

(Continued)

FOREIGN PATENT DOCUMENTS

| EP | 0566208 A1 | 10/1993 |
|---|---|---|
| JP | 1989-106768 U | 7/1989 |
| JP | 0277478 U | 6/1990 |

*Primary Examiner* — Jason Thompson
(74) *Attorney, Agent, or Firm* — Hoyng Rock Monegier LLP; Philip Tsai; David P. Owen

(57) ABSTRACT

A heat transfer cell includes first and second heat transfer plates which have first and second heat transfer areas, and first and second flanges bent from the first and second heat transfer areas so as to have a height difference with respect to the first and second heat transfer areas. The first and second heat transfer plates are joined into a cell body so as to be opposite to each other in a mirror image, and the cell body having a first fluid passage therein, weld lines formed along the first contacting each other and along the second flanges contacting each other, and external recesses formed outside the heat transfer areas for second fluid passages intersecting with the first fluid passage at a right angle.

12 Claims, 13 Drawing Sheets

(51) Int. Cl.
 B23P 15/26 (2006.01)
 F28F 19/00 (2006.01)

(56) References Cited

U.S. PATENT DOCUMENTS

| | | | | |
|---|---|---|---|---|
| 4,758,385 | A | * | 7/1988 | Acker .................... F24F 5/0035 |
| | | | | 261/104 |
| 4,858,685 | A | | 8/1989 | Szücs et al. |
| 5,036,907 | A | | 8/1991 | Levén |
| 5,228,515 | A | * | 7/1993 | Tran ...................... F28D 9/0037 |
| | | | | 165/166 |
| 5,383,516 | A | | 1/1995 | Dinulescu |
| 5,655,600 | A | | 8/1997 | Dewar et al. |
| 5,832,993 | A | * | 11/1998 | Ohata .................... F28D 9/0012 |
| | | | | 165/166 |
| 6,378,604 | B1 | | 4/2002 | Feind et al. |
| 6,516,874 | B2 | | 2/2003 | Mathur et al. |
| 2003/0093900 | A1 | | 5/2003 | Huguet et al. |
| 2005/0061493 | A1 | | 3/2005 | Holtzapple |
| 2005/0077637 | A1 | | 4/2005 | Mockry et al. |
| 2007/0044946 | A1 | | 3/2007 | Mehendale et al. |
| 2007/0084593 | A1 | * | 4/2007 | Besant .................... F28D 9/005 |
| | | | | 165/167 |

* cited by examiner

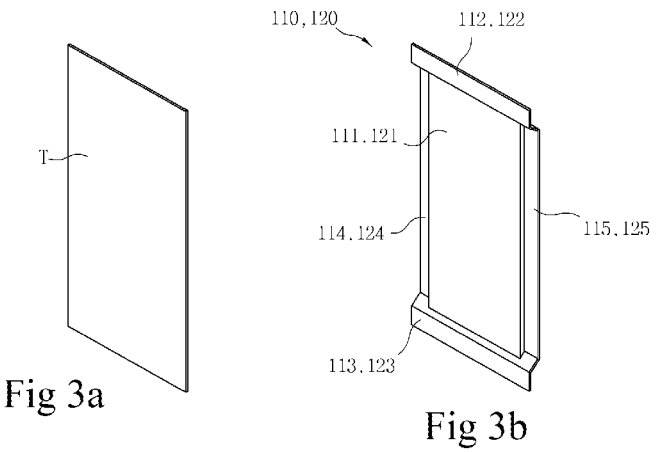
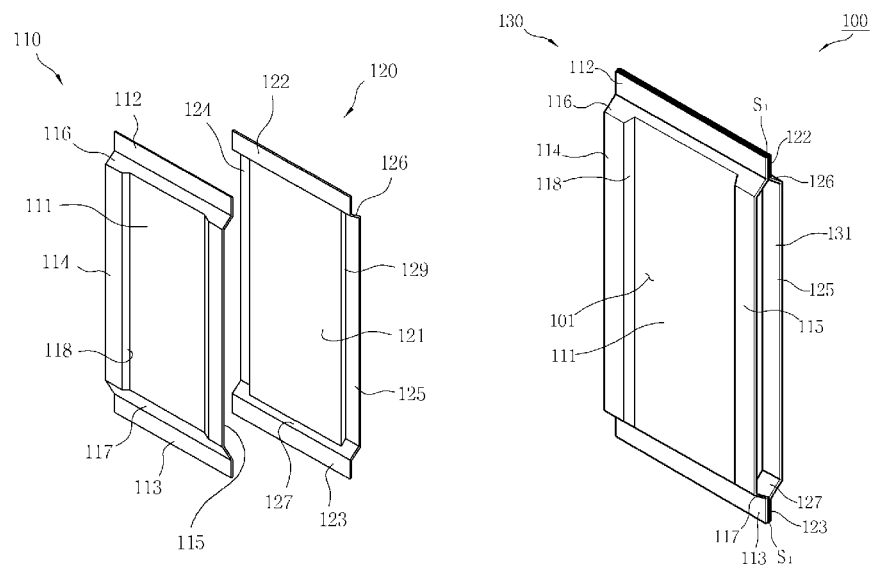
Fig 3a  Fig 3b
Fig 3c  Fig 3d

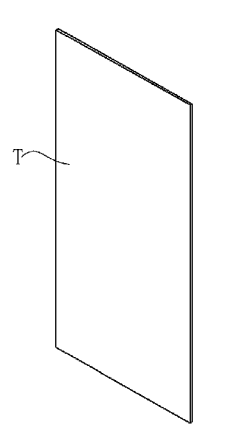
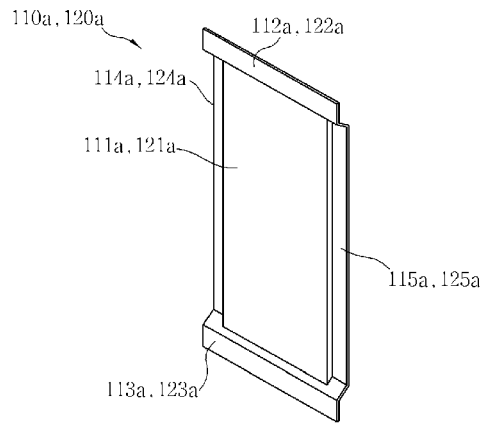
Fig 6a
Fig 6b
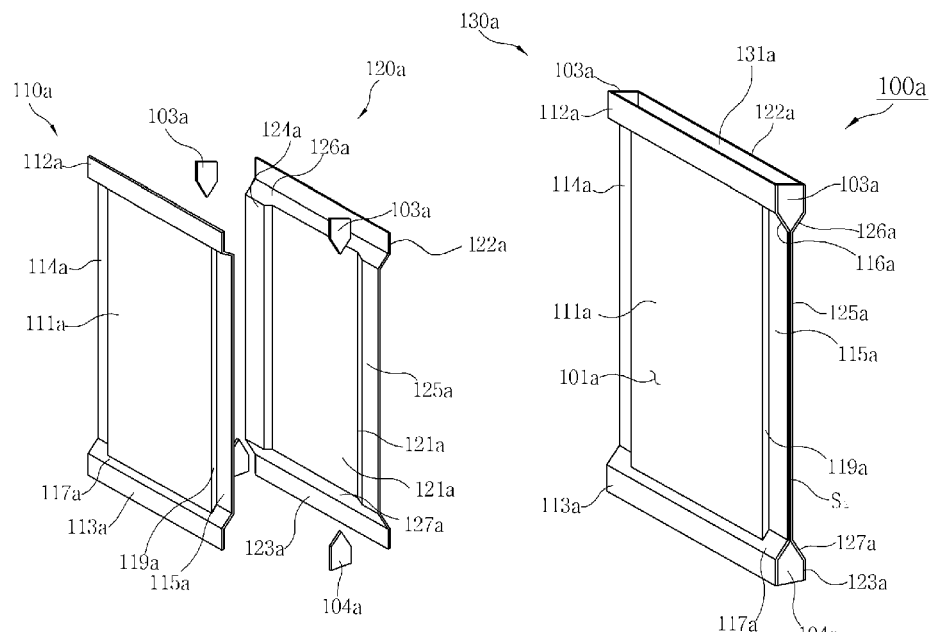
Fig 6c
Fig 6d

HEAT TRANSFER CELL FOR HEAT EXCHANGER AND ASSEMBLY, AND METHODS OF FABRICATING THE SAME

CROSS REFERENCE TO RELATED APPLICATIONS

This application is a continuation of U.S. Ser. No. 12/499,956 filed on 9 Jul. 2009, which claims priority from Korean Patent Application No. 10-2008-0066435 filed on 9 Jul. 2008. Both applications are hereby incorporated by reference in their entireties.

BACKGROUND OF THE INVENTION

1. Field of the Invention

The present invention relates to a heat transfer cell and assembly for a heat exchanger and methods of fabricating the same, and more particularly, to a heat transfer cell and assembly for a heat exchanger and methods of fabricating the same, capable of minimizing vortex at and in the inlet of a passage into and through which a fluid flows, increasing a contact area between the fluid and its contact plate to improve heat exchange efficiency, easily and rapidly fabricating an assembly by stacking a plurality of heat transfer cells to improve productivity, preventing welding defects resulting from downward sagging of the heat transfer plate when the heat transfer cells are stacked, reducing the number of whole constituent parts and the resulting fabricating costs, and improving assemblability.

2. Description of the Related Art

In general, heat exchangers are fluid-to-fluid heat recovery apparatuses that recover heat included in gases discharged to the outside in industrial facilities such as air-conditioning facilities and then supply the recovered heat to productive facilities or interiors of buildings.

These heat exchangers are designed to perform heat transfer (heat exchange) between a high-temperature fluid and a low-temperature fluid without a physical contact, and are classified into a plate type heat exchanger, a heat pipe type heat exchanger, a disc type heat exchanger, etc. according to the type of a heat exchange module that is an internal core part.

Among these heat exchangers, the plate type heat exchanger recovers heat by arranging a plurality of heat transfer plates in parallel to each other at predetermined intervals, adopting a gap between every two neighboring heat transfer plates as a channel through which a fluid flows in one direction, and alternately supplying a high-temperature fluid and a low-temperature fluid to the respective channels so as to perform heat transfer (heat exchange) through the respective heat transfer plates.

One example of the plate type heat exchanger is disclosed in Korean Patent Publication No. 1993-0702655 (Sep. 9, 1993). According to the plate type heat exchanger of this document, a rigid parallelepiped shaped core is installed in a frame, and the core is formed of a plurality of thin parallel plates that define alternating passages for two different fluid flows. Each of the thin parallel plates is connected to its adjacent plate by parallel bars alongside edges thereof, wherein each bar is of stronger construction than each plate. The frame includes a pair of spaced parallel plates and transverse structural connectors. Seal means are provided both between vertical corners and transverse corners of the core and the adjacent surfaces of the frame defined by the pair of plates and by the structural connectors.

However, in this related art, the plurality of thin parallel plates constituting the core are welded so as to define the fluid passages, i.e. first and second gas flow passages, intersecting at right angle via the plurality of vertical, horizontal bars. For this reason, a process of individually welding the bars to an inlet and an outlet between the adjacent plates disposed in parallel requires a high precision of welding, which further increases the burden of a worker and reduces work efficiency. Further, the number of constituent parts is increased to act as a main factor that increases fabrication costs.

Further, the core is assembled by repeating a process of horizontally disposing the first plate, a process of stacking the second plate on the first plate via the bars, and a process of welding the bars to the plates so as to have the first and second gas flow passages intersecting at right angle. When each plate made of metal is welded, the plate sags due to its own weight, which leads to a failure in welding.

In the case in which a heat transfer area of the plate is increased in order to meet design requirements of large facilities, a sagging amount of the plate is relatively increased in proportion to the heat transfer area of the plate. Thus, this welding failure acts as a factor that reduces product reliability.

Further, the first fluid and the second fluid flowing to the different passages of the core collide with a vertical front face of each bar installed at the inlet of the passage, so that fluid vortex and fluid resistance take place at the inlet of the passage, and so that a flow of the fluid flowing into each passage forms a turbulent flow rather than a laminar flow. For this reason, a contact area between the plate as the heat transfer member and the fluid is reduced, and thus heat exchange efficiency is reduced.

Meanwhile, when the heat is exchanged between the first and second fluids having different temperatures via the plate, one of the fluids which has an atmospheric temperature is typically subjected to the heat exchange by contacting the plate heated by the other fluid having relatively high temperature, for instance 200° C. or more. Thus, moisture can be created on a surface of the plate due to the temperature difference between the heated plate and the room-temperature fluid.

This moisture is mainly created at the inlet of the passage through which the fluid having the atmospheric temperature flows. The moisture acts as a main factor that corrodes the plate made of metal to reduce the lifespan of the product.

BRIEF SUMMARY OF THE INVENTION

Embodiments of the present invention provide a heat transfer cell for a heat exchanger and a method of fabricating the same, capable of minimizing vortex at and in the inlet of a passage into and through which a fluid flows, and increasing a contact area between the fluid and its contact plate to improve heat exchange efficiency.

There is also provided a heat transfer assembly for a heat exchanger and a method of fabricating the same, capable of easily and rapidly fabricating an assembly by stacking a plurality of heat transfer cells, preventing welding defects resulting from downward sagging of the heat transfer plate when the heat transfer cells are stacked, reducing the number of whole constituent parts and the resulting fabricating costs, improving assemblability, and preventing moisture from being generated when the heated plate exchanges heat with the fluid.

According to an aspect of the present invention, there is provided a heat transfer cell for a heat exchanger, which includes: a first heat transfer plate having a first heat transfer area shaped of a quadrilateral panel, and a pair of first flanges bent from the first heat transfer area so as to have a height difference with respect to the first heat transfer area; a second heat transfer plate having a second heat transfer area shaped of a quadrilateral panel, and a pair of second flanges bent from the second heat transfer area in a direction opposite the bending direction of the first flanges so as to have a height difference with respect to the second heat transfer area, wherein the first and second heat transfer plates are joined into a cell body so as to be opposite to each other in a mirror image; and the cell body having a first fluid passage therein, weld lines formed along the first flanges contacting each other and along the second flanges contacting each other, and external recesses formed outside the heat transfer areas for second fluid passages intersecting with the first fluid passage at a right angle.

In an exemplary embodiment of the present invention, each of the first and second heat transfer plates may include the first flanges that are bent from opposite edges of each of the first and second heat transfer areas in one direction and that run parallel to each of the first and second heat transfer areas with a predetermined length, and the second flanges that are bent from the other opposite edges of each of the first and second heat transfer areas in the direction opposite the bending direction of the first flanges and that run parallel to each of the first and second heat transfer areas with a predetermined length.

In another exemplary embodiment of the present invention, the cell body may include the weld lines formed along the first flanges that are opposite to and in contact with each other, and inlet and outlet that are connected with the first fluid passage and are defined by the second flanges that are opposite to and spaced apart from each other.

In another exemplary embodiment of the present invention, the cell body may include first slopes that are inclined toward the weld lines among the first flanges, the first or second heat transfer area, and the second flanges at a predetermined angle, and second slopes that are inclined toward the inlet and the outlet between the second flanges and the first or second heat transfer area at a predetermined angle.

In another exemplary embodiment of the present invention, the cell body may include the weld lines formed along the second flanges of the heat transfer plates which are opposite to and in contact with each other in the mirror image, and an inlet and an outlet that are connected with the first fluid passage and are defined by the first flanges that are opposite to and spaced apart from each other.

In another exemplary embodiment of the present invention, the cell body may include first slopes inclined toward the inlet and the outlet among the first flanges, the first or second heat transfer area, and the second flanges at a predetermined angle, second slopes inclined toward the weld lines between the second flanges and the first or second heat transfer area at a predetermined angle, and end plates that are in contact with the second flanges together with the weld lines at left-hand and right-hand ends of the first flanges forming the inlet and outlet.

In another exemplary embodiment of the present invention, the cell body may include a spacer set that maintains an interval of the first fluid passage between the first and second heat transfer areas.

In another exemplary embodiment of the present invention, the spacer set may include a plurality of stud spacers, a lower end of each of which is fixed to one of the first and second heat transfer areas so as to intersect with one of the first and second heat transfer areas at a right angle.

In another exemplary embodiment of the present invention, the spacer set may include a plurality of strip spacers, a lower end of each of which is fixed to one of the first and second heat transfer areas so as to intersect with one of the first and second heat transfer areas at a right angle, and each of which extends in a flow direction of a fluid at a predetermined length.

In another exemplary embodiment of the present invention, the spacer set may include a plurality of stud spacers, a lower end of each of which is fixed to one of the first and second heat transfer area so as to intersect with one of the first and second heat transfer areas at a right angle, and a plurality of strip spacers, a lower end of each of which is fixed to one of the first and second heat transfer areas so as to intersect with one of the first and second heat transfer areas at a right angle and each of which extends in a flow direction of the fluid at a predetermined length.

According to another aspect of the present invention, there is provided a method of fabricating a heat transfer cell for a heat exchanger. The method includes: preparing a quadrilateral panel; bending the quadrilateral panel into a heat transfer plate so as to form a pair of first flanges and a pair of second flanges having a height difference with respect to a heat transfer area formed on a central region of the heat transfer plate, the first flanges being located perpendicular to the second flanges; and disposing two heat transfer plates so as to be opposite to each other in a mirror image, joining the two heat transfer plates to form a first fluid passage, weld lines along the first contacting each other and along the second flanges contacting each other, and external recesses outside the heat transfer areas for second fluid passages intersecting with the first fluid passage at a right angle, and thereby forming a cell body.

In an exemplary embodiment of the present invention, the bending of the quadrilateral panel into a heat transfer plate may simultaneously or sequentially perform bending opposite edges of the heat transfer areas in one direction to form the first flanges that run parallel to the heat transfer areas with a predetermined length, and bending the other opposite edges of the heat transfer areas in a direction opposite the bending direction of the first flanges to form the second flanges that run parallel to the heat transfer areas with a predetermined length.

In another exemplary embodiment of the present invention, the bending of the quadrilateral panel into a heat transfer plate may further include forming first slopes that are inclined among the first flanges, the heat transfer area, and the second flanges at a predetermined angle, and forming second slopes that are inclined between the second flanges and the transfer section at a predetermined angle.

In another exemplary embodiment of the present invention, the forming of a cell body may include forming the weld lines along the first flanges that are opposite to and in contact with each other, and inlet and outlet that are connected with the first fluid passage and are defined by the second flanges that are opposite to and spaced apart from each other.

In another exemplary embodiment of the present invention, the forming of a cell body may include forming the weld lines along the second flanges that are opposite to and in contact with each other, forming an inlet and an outlet that are connected with the first fluid passage and are defined by the first flanges that are opposite to and spaced apart from each other, and installing end plates that are in contact with the second flanges together with the weld lines at left-hand and right-hand ends of the first flanges forming the inlet and outlet.

In another exemplary embodiment of the present invention, the method may include, prior to forming a cell body, forming a spacer set that maintains an interval of the first fluid passage between the first and second heat transfer areas.

In another exemplary embodiment of the present invention, the forming of a spacer set may include fixing a plurality of stud spacers to the heat transfer area at lower ends thereof so as to intersect with the heat transfer area at a right angle.

In another exemplary embodiment of the present invention, the forming of a spacer set may include fixing a plurality of strip spacers to the heat transfer area at lower ends thereof so as to intersect with one of the heat transfer area at a right angle, each of the spacer spacers extending in a flow direction of a fluid at a predetermined length.

In another exemplary embodiment of the present invention, the forming of a spacer set may include fixing a plurality of stud spacers to the heat transfer area at lower ends thereof so as to intersect with the heat transfer area at a right angle, fixing a plurality of strip spacers to the heat transfer area at lower ends thereof so as to intersect with one of the heat transfer area at a right angle, each of the spacer spacers extending in a flow direction of a fluid at a predetermined length.

According to another aspect of the present invention, there is provided a heat transfer assembly for a heat exchanger, which includes: a first heat transfer plate having a first heat transfer area shaped of a quadrilateral panel, and a pair of first flanges bent from the first heat transfer area so as to have a height difference with respect to the first heat transfer area; a second heat transfer plate having a second heat transfer area shaped of a quadrilateral panel, and a pair of second flanges bent from the second heat transfer area in a direction opposite the bending direction of the first flanges so as to have a height difference with respect to the second heat transfer area, wherein the first and second heat transfer plates are joined into a cell body so as to be opposite to each other in a mirror image; and the cell body having a first fluid passage therein, weld lines formed along the first contacting each other and along the second flanges contacting each other, and external recesses formed outside the heat transfer areas for second fluid passages intersecting with the first fluid passage at a right angle, wherein at least two cell bodies are stacked in multiple layers and form the second fluid passages intersecting with the first fluid passage at the right angle, between the two neighboring cell bodies, and fluids having different temperatures exchange heat with each other without physical contact while flowing through the first and second fluid passages.

In an exemplary embodiment of the present invention, each of the first and second heat transfer plates may include the first flanges that are bent from opposite edges of each of the first and second heat transfer areas in one direction and that run parallel to each of the first and second heat transfer areas with a predetermined length, and the second flanges that are bent from the other opposite edges of each of the first and second heat transfer areas in the direction opposite the bending direction of the first flanges and that run parallel to each of the first and second heat transfer areas with a predetermined length.

In another exemplary embodiment of the present invention, the cell body may include the weld lines formed along the first flanges that are opposite to and in contact with each other, and inlet and outlet that are connected with the first fluid passage and are defined by the second flanges that are opposite to and spaced apart from each other.

In another exemplary embodiment of the present invention, the cell body may include first slopes that are inclined toward the weld lines among the first flanges, the first or second heat transfer area, and the second flanges at a predetermined angle, and second slopes that are inclined toward the inlet and the outlet between the second flanges and the first or second heat transfer area at a predetermined angle.

In another exemplary embodiment of the present invention, the cell body may include the weld lines formed along the second flanges of the heat transfer plates which are opposite to and in contact with each other in the mirror image, and an inlet and an outlet that are connected with the first fluid passage and are defined by the first flanges that are opposite to and spaced apart from each other.

In another exemplary embodiment of the present invention, the cell body may include first slopes inclined toward the inlet and the outlet among the first flanges, the first or second heat transfer area, and the second flanges at a predetermined angle, second slopes inclined toward the weld lines between the second flanges and the first or second heat transfer area at a predetermined angle, and end plates that are in contact with the second flanges together with the weld lines at left-hand and right-hand ends of the first flanges forming the inlet and outlet.

In another exemplary embodiment of the present invention, the cell body may include a spacer set that maintains an interval of the first fluid passage between the first and second heat transfer areas.

In another exemplary embodiment of the present invention, the spacer set may include a plurality of stud spacers, a lower end of each of which is fixed to one of the first and second heat transfer areas so as to intersect with one of the first and second heat transfer areas at a right angle.

In another exemplary embodiment of the present invention, the spacer set may include a plurality of strip spacers, a lower end of each of which is fixed to one of the first and second heat transfer areas so as to intersect with one of the first and second heat transfer areas at a right angle, and each of which extends in a flow direction of a fluid at a predetermined length.

In another exemplary embodiment of the present invention, the spacer set may include a plurality of stud spacers, a lower end of each of which is fixed to one of the first and second heat transfer area so as to intersect with one of the first and second heat transfer areas at a right angle, and a plurality of strip spacers, a lower end of each of which is fixed to one of the first and second heat transfer areas so as to intersect with one of the first and second heat transfer areas at a right angle and each of which extends in a flow direction of the fluid at a predetermined length.

In an exemplary embodiment of the present invention, the cell bodies stacked in multiple layers may include the second fluid passages which intersect with the first fluid passage at the right angle and are formed by the second flanges that are in surface contact with each other, the inlet and the outlet which are connected with the second fluid passages and are defined by the first flanges that are adjacent to and spaced apart from each other, and the end plates that are in contact with the second flanges at the left-hand and right-hand ends of the first flanges.

In another exemplary embodiment of the present invention, the cell bodies stacked in multiple layers may include the second fluid passages which intersect with the first fluid passage at the right angle and are formed by the first flanges that are in surface contact with each other, and the inlet and the outlet which are connected with the second fluid passages and are defined by the second flanges that are adjacent to and spaced apart from each other.

In another exemplary embodiment of the present invention, the heat transfer assembly may further include cover members installed at the inlet of one of the first and second fluid passages, into which the fluid having a relatively lower temperature flows, wherein each of the cover members includes a pair of isometric flat sections inclined with respect to the flanges forming the inlet, and curved sections extending from the isometric flat sections with a predetermined curvature.

In another exemplary embodiment of the present invention, each of the cover members may be fixed to the slopes in a manner that ends of the isometric flat sections are in contact with the slopes through which the flanges are connected with the heat transfer areas, and include an air space filled with air between the flanges and the cover member with a leading end of the cover member spaced apart from the weld line formed by welding the flanges by a predetermined distance.

According to another aspect of the present invention, there is provided a method of fabricating a heat transfer assembly for a heat exchanger. The method includes: preparing a quadrilateral panel; bending the quadrilateral panel into a heat transfer plate so as to form a pair of first flanges and a pair of second flanges having a height difference with respect to a heat transfer area formed on a central region of the heat transfer plate, the first flanges being located perpendicular to the second flanges; disposing two heat transfer plates so as to be opposite to each other in a mirror image, joining the two heat transfer plates to form a first fluid passage, weld lines along the first contacting each other and along the second flanges contacting each other, and external recesses outside the heat transfer areas for second fluid passages intersecting with the first fluid passage at a right angle, and thereby forming a cell body; and stacking a plurality of cell bodies in multiple layers so as to have the second fluid passages intersecting with the first fluid passage between the neighboring cell bodies.

In an exemplary embodiment of the present invention, the bending of the quadrilateral panel into a heat transfer plate may simultaneously or sequentially perform bending opposite edges of the heat transfer areas in one direction to form the first flanges that run parallel to the heat transfer areas with a predetermined length, and bending the other opposite edges of the heat transfer areas in a direction opposite the bending direction of the first flanges to form the second flanges that run parallel to the heat transfer areas with a predetermined length.

In another exemplary embodiment of the present invention, the bending of the quadrilateral panel into a heat transfer plate may further include forming first slopes that are inclined among the first flanges, the heat transfer area, and the second flanges at a predetermined angle, and forming second slopes that are inclined between the second flanges and the transfer section at a predetermined angle.

In another exemplary embodiment of the present invention, the forming of a cell body may include forming the weld lines along the first flanges that are opposite to and in contact with each other, and inlet and outlet that are connected with the first fluid passage and are defined by the second flanges that are opposite to and spaced apart from each other.

In another exemplary embodiment of the present invention, the forming of a cell body may include forming the weld lines along the second flanges that are opposite to and in contact with each other, forming an inlet and an outlet that are connected with the first fluid passage and are defined by the first flanges that are opposite to and spaced apart from each other, and installing end plates that are in contact with the second flanges together with the weld lines at left-hand and right-hand ends of the first flanges forming the inlet and outlet.

In another exemplary embodiment of the present invention, the method may include, prior to forming a cell body, forming a spacer set that maintains an interval of the first fluid passage between the first and second heat transfer areas.

In another exemplary embodiment of the present invention, the forming of a spacer set may include fixing a plurality of stud spacers to the heat transfer area at lower ends thereof so as to intersect with the heat transfer area at a right angle.

In another exemplary embodiment of the present invention, the forming of a spacer set may include fixing a plurality of strip spacers to the heat transfer area at lower ends thereof so as to intersect with one of the heat transfer area at a right angle, each of the spacer spacers extending in a flow direction of a fluid at a predetermined length.

In another exemplary embodiment of the present invention, the forming of a spacer set may include fixing a plurality of stud spacers to the heat transfer area at lower ends thereof so as to intersect with the heat transfer area at a right angle, fixing a plurality of strip spacers to the heat transfer area at lower ends thereof so as to intersect with one of the heat transfer area at a right angle, each of the spacer spacers extending in a flow direction of a fluid at a predetermined length.

In another exemplary embodiment of the present invention, the stacking of a plurality of cell bodies in multiple layers may include forming the second fluid passages which intersect with the first fluid passage at the right angle and are formed by the second flanges that are in surface contact with each other, forming the inlet and the outlet which are connected with the second fluid passages and are defined by the first flanges that are adjacent to and spaced apart from each other, and installing the end plates that are in contact with the second flanges at the left-hand and right-hand ends of the first flanges.

In another exemplary embodiment of the present invention, the stacking of a plurality of cell bodies in multiple layers may include forming the second fluid passages which intersect with the first fluid passage at the right angle and are formed by the first flanges that are in surface contact with each other, and forming the inlet and the outlet which are connected with the second fluid passages and are defined by the second flanges that are adjacent to and spaced apart from each other.

According to the exemplary embodiments of the present invention, the cell body is configured so that a pair of heat transfer plates includes a pair of first flanges and a pair of second flanges, each of which has a height difference with respect to the quadrilateral heat transfer area and is bent in a direction perpendicular to the other pair of flanges, is joined so as to opposite to each other in a mirror image, thereby forming a first fluid passage and weld lines along the flanges contacting each other. Thereby, the cell body can minimize vortex and resistance of fluid at and in the inlet of a passage into and through which the fluid flows, so that it can increase a contact area between the fluid and its contact plate and stably maintain contact between the fluid and the heat transfer plate, thereby improving heat exchange efficiency.

Further, each heat transfer cell prevents downward sagging due to weight of the heat transfer plate when a heat transfer assembly is fabricated by stacking a plurality of heat transfer cells in multiple layers, so that it can prevent welding defects and reduce the number of whole constituent parts and the resulting fabricating costs.

In addition, an air space is additionally formed at the inlet into which the fluid having a relatively lower temperature flows, so that the moisture can be prevented from being generated by a sharp temperature difference when the heated plate exchanges heat with the fluid. Thereby, the corrosion caused by the moisture can be prevented, and a lifespan can be prolonged.

BRIEF DESCRIPTION OF THE DRAWINGS

The above and other aspects, features and other advantages of the present invention will be more clearly understood from the following detailed description taken in conjunction with the accompanying drawings, in which:

FIGS. 2A and 2B are cross-sectional views illustrating a heat transfer cell for a heat exchanger according to a first embodiment of the present invention, wherein FIG. 2A is a cross-sectional view taken along line 2a-2a' of FIG. 1, and FIG. 2B is a cross-sectional view taken along line 2b-2b' of FIG. 1;

FIGS. 3A through 3D illustrate a process of fabricating a heat transfer cell for a heat exchanger according to a first embodiment of the present invention;

FIGS. 5A and 5B are cross-sectional views illustrating a heat transfer cell for a heat exchanger according to a second embodiment of the present invention, wherein FIG. 5A is a cross-sectional view taken along line 5a-5a' of FIG. 4, and FIG. 5B is a cross-sectional view taken along line 5b-5b' of FIG. 4;

FIGS. 6A through 6D illustrate a process of fabricating a heat transfer cell for a heat exchanger according to a second embodiment of the present invention;

FIGS. 10A through 10F are perspective views illustrating a set of spacers installed on a heat transfer cell for a heat exchanger according to first and second embodiments of the present invention, wherein FIGS. 10A and 10B are for a stud type, FIGS. 10C and 10D are for a strip type, and FIGS. 10E and 10F are for a mixed type.

DESCRIPTION OF ILLUSTRATIVE EMBODIMENTS

Exemplary embodiments of the present invention will now be described in greater detail with reference to the accompanying drawings.

Figure 1:
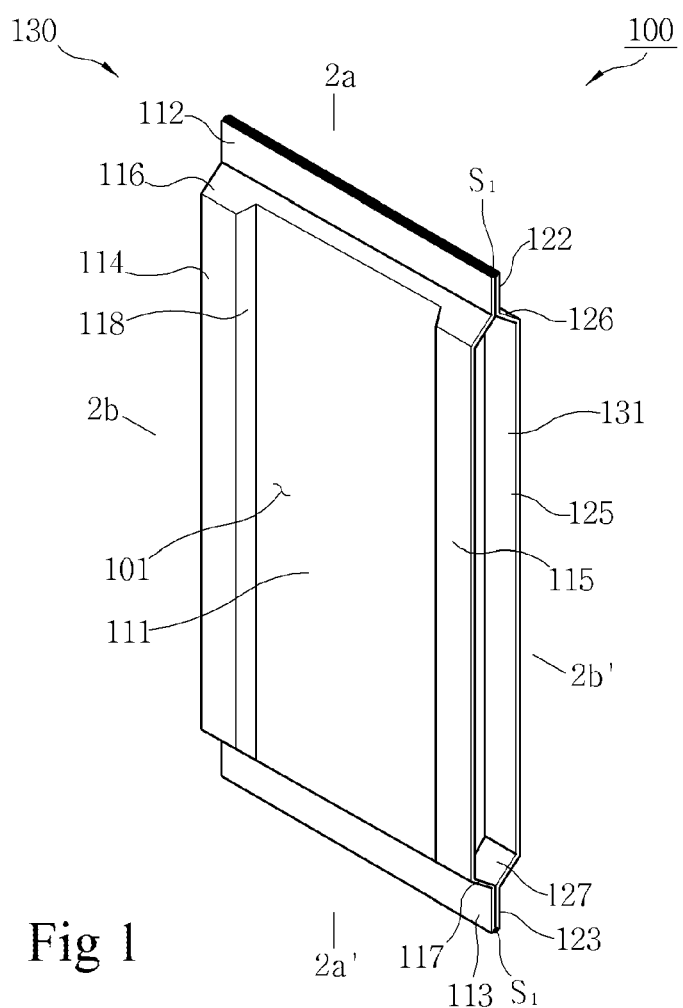
FIG. 1 is an entire perspective view illustrating a heat transfer cell for a heat exchanger according to a first embodiment of the present invention.
Figures 2A, 2B:
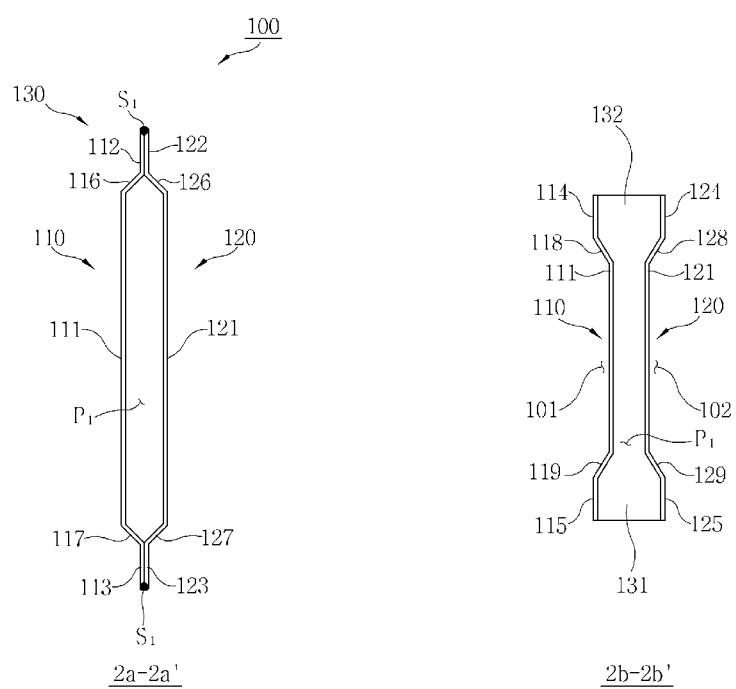

FIG. 1 is an entire perspective view illustrating a heat transfer cell for a heat exchanger according to a first embodiment of the present invention. FIGS. 2A and 2B are cross-sectional views illustrating a heat transfer cell for a heat exchanger according to a first embodiment of the present invention, wherein FIG. 2A is a cross-sectional view taken along line 2a-2a' of FIG. 1, and FIG. 2B is a cross-sectional view taken along line 2b-2b' of FIG. 1.

According to the first embodiment of the present invention, as illustrated in FIGS. 1 and 2, the heat transfer cell 100 includes a cell body 130 having a first (or transverse) fluid passage P1, i.e. an internal fluid passage, through which a fluid flows in one direction. The cell body 130 is obtained by welding a pair of heat transfer plates 110 and 120, which are opposite to each other in a mirror image.

The heat transfer plate 110 or 120 includes a heat transfer area 111 or 121 shaped of a substantially quadrilateral panel, a pair of first flanges 112 and 113, or 122 and 123 bent from opposite upper and lower edges of the heat transfer area 111 or 121 in one direction when viewed from FIG. 1 and having a height difference with respect to the heat transfer area 111 or 121, and a pair of second flanges 114 and 115, or 124 and 125 bent from opposite left-hand and right-hand edges of the heat transfer area 111 or 121 in the direction opposite the bending direction of the first flanges 112 and 113, or 122 and 123 and having a height difference with respect to the heat transfer area 111 or 121.

The first flanges 112 and 113, and 122 and 123 are planar sections that are bent from the opposite upper and lower edges of the heat transfer areas 111 and 121 in one direction, that run parallel to the heat transfer areas 111 and 121 with a predetermined length and a height difference with respect to the heat transfer areas 111 and 121, and that are in contact with each other. The second flanges 114 and 115, and 124 and 125 are planar sections that are bent from the opposite left-hand and right-hand edges of the heat transfer areas 111 and 121 in the direction opposite the bending direction of the first flanges 112 and 113, and 122 and 123, that run parallel to the heat transfer areas 111 and 121 with a predetermined length and a height difference with respect to the heat transfer areas 111 and 121, and that are spaced apart from each other.

The cell body 130 includes the first fluid passage P1 therein which has open opposite ends by welding the heat transfer plates 110 and 120 that are opposite to each other in a mirror image, weld lines S1 that weld and seal faying surfaces of the first flanges 112 and 122, and 113 and 123 facing each other, and external recesses 101 and 102 that are formed outside the heat transfer areas 111 and 121 for second fluid passages intersecting with the first fluid passage P1 at a right angle.

Here, the weld lines S1 can be formed by, but not limited to, arc welding in which all or outer ends of the faying surfaces of the first flanges 112 and 122, and 113 and 123 of the heat transfer plates 110 and 120 contacting each other are fused and joined by a welding electrode. Thus, the weld lines S1 may be formed by another type of welding.

When the heat transfer plates 110 and 120 are welded, the second flanges 114 and 124, and 115 and 125, which are opposite to and spaced apart from each other, define an inlet 131 and an outlet 132 connected with the first fluid passage P1.

Here, the weld lines S1 are formed parallel to the first fluid passage P1, but perpendicular to the external recesses 101 and 102 for the second fluid passages. The inlet 131 and the outlet 132 can be subjected to reversal of their functions according to a direction in which the fluid is fed to the first fluid passage P1.

First slopes 116 and 117, or 126 and 127 are inclined toward the weld lines among the first flanges 112 and 113, or 122 and 123, the heat transfer area 111 or 121, and the second flanges 114 and 115, or 124 and 125 at a predetermined angle. Further, second slopes 118 and 119, or 128 and 129 are inclined toward the inlet 131 and the outlet 132 of the first fluid passage P1 between the second flanges 114 and 115, or 124 and 125 and the heat transfer area 111 or 121 at a predetermined angle, and thus define the external recesses 101 and 102 for the second fluid passages between the second flanges 114 and 115, or 124 and 125 with a predetermined width.

These first and second slopes smoothly convert the flows of the fluids that flow into the first and second fluid passages, exchange heat through the heat transfer areas, and flow out of the first and second fluid passages, thereby inhibiting vortex from being generated at the inlet and outlet of each of the first and second fluid passages.

Here, the predetermined angles of the first and second slopes are preferably set to about 45° so as to minimize resistance of the fluid.

Thus, the fluid flowing into and out of the first fluid passage and the fluid flowing into and out of the second fluid passages defined by the external recesses undergo minimized vortex, so that a contact area between the fluid in each passage and the heat transfer area 111 or 112 is increased, and thus thermal efficiency can be increased.

FIGS. 3A through 3D illustrate a process of fabricating a heat transfer cell for a heat exchanger according to a first embodiment of the present invention.

First, as illustrated in FIG. 3A, there is prepared a plate T, which is shaped of a substantially quadrilateral panel and is made of metal having high thermal conductivity. The plate T is placed on a press (not shown), and then external force having predetermined magnitude is applied to the plate T through a die. Thereby, as illustrated in FIG. 3B, the plate T is formed into the heat transfer plate 110 or 120, which has the heat transfer area 111 or 121 shaped of a quadrilateral panel in a central region, the first flanges 112 and 113, or 122 and 123 bent from opposite upper and lower edges of the heat transfer area 111 or 121 in one direction and having a height difference with respect to the heat transfer area 111 or 121, and the second flanges 114 and 115, or 124 and 125 bent from opposite left-hand and right-hand edges of the heat transfer area 111 or 121 in the direction opposite the bending direction of the first flanges 112 and 113, or 122 and 123 and having a height difference with respect to the heat transfer area 111 or 121.

When the first and second flanges are formed, both a process of forming first slopes 116 and 117, or 126 and 127 that are inclined among the first flanges 112 and 113, or 122 and 123, the heat transfer area 111 or 121, and the second flanges 114 and 115, or 124 and 125 at a predetermined angle and a process of forming second slopes 118 and 119, or 128 and 129 that are inclined between the second flanges 114 and 115, or 124 and 125 and the heat transfer area 111 or 121 at a predetermined angle are preformed at the same time. Alternatively, the processes of forming the first and second slopes may be separately performed.

Subsequently, as illustrated in FIG. 3C, the heat transfer plates 110 and 120 are disposed in a mirror image such that a distance between the first flanges 112 and 113, or 122 and 123 is relatively shorter than that between the second flanges 114 and 115, or 124 and 125.

In this state, the first flanges 112 and 122, and 133 and 123 come into surface contact with each other, and then are welded along the outer ends thereof. As a result, as illustrated in FIG. 3D, the outer ends of the first flanges 112 and 122, and 133 and 123 have weld lines S1. Further, the inlet 131 and the outlet 132 connected with the first fluid passage P1 are formed between the second flanges 114 and 124, and 115 and 125, and the external recesses 101 and 102 for the second fluid passages are formed between the second flanges 114 and 115, and 124 and 125. Thereby, the heat transfer cell 100 is fabricated.

Here, the external recesses 101 and 102 define the second fluid passages P2, through which a second fluid flows, perpendicular to the first fluid passage P1, through which a first fluid flows, when the heat transfer cell 100 is joined with another heat transfer cell 100.

Meanwhile, both the process of forming the first flanges 112 and 113, and 122 and 123 that are bent from the opposite upper and lower edges of the heat transfer areas 111 and 121 in one direction and that run parallel to heat transfer areas 111 and 121 with a predetermined length and the process of forming the second flanges 114 and 115, and 124 and 125 that are bent from the opposite left-hand and right-hand edges of the heat transfer areas 111 and 121 in the direction opposite the bending direction of the first flanges 112 and 113, and 122 and 123 and that run parallel to heat transfer areas 111 and 121 with a predetermined length can be simultaneously performed using, but not limited to, one die. Thus, these processes may be sequentially performed using two dies.

Figure 4:
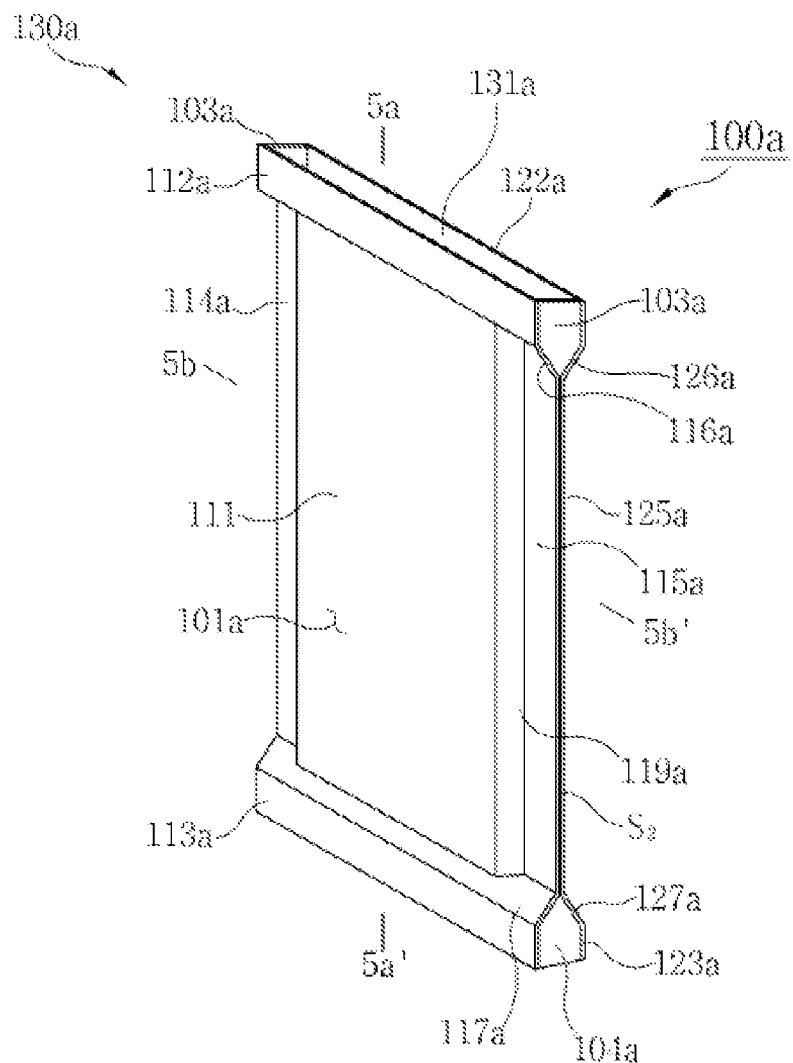
FIG. 4 is an entire perspective view illustrating a heat transfer cell for a heat exchanger according to a second embodiment of the present invention.
Figures 5A, 5B:
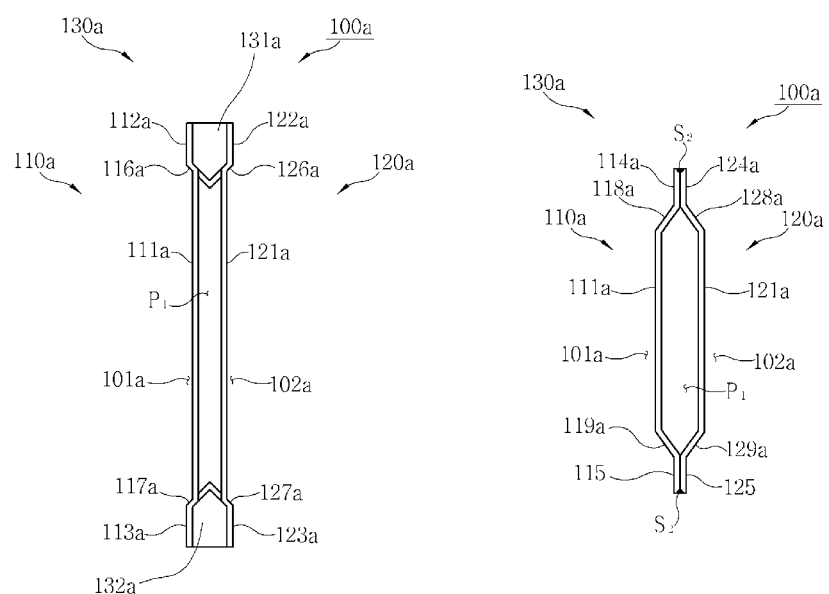

FIG. 4 is an entire perspective view illustrating a heat transfer cell for a heat exchanger according to a second embodiment of the present invention. FIGS. 5A and 5B are cross-sectional views illustrating a heat transfer cell for a heat exchanger according to a second embodiment of the present invention, wherein FIG. 5A is a cross-sectional view taken along line 5a-5a' of FIG. 4, and FIG. 5B is a cross-sectional view taken along line 5b-5b' of FIG. 4.

According to a second embodiment of the present invention, as illustrated in FIGS. 4 and 5, the heat transfer cell 100a includes a cell body 130a having a first fluid passage P1, i.e. an internal fluid passage, through which a fluid flows in one direction, by welding a pair of heat transfer plates 110a and 120a, which are opposite to each other in a mirror image.

As in the first embodiment, the heat transfer plates 110a and 120a includes a pair of first flanges 112a and 113a, or 122a and 123a and a pair of second flanges 114a and 115a, or 124a and 125a, each of which is bent and extends in a direction perpendicular to each other and has a height difference with respect to the heat transfer area 111a or 121a shaped of a substantially quadrilateral panel.

The cell body 130a includes the first fluid passage P1 therein which has open opposite ends by welding the heat transfer plates 110a and 120a that are opposite to each other in a mirror image, weld lines S2 that weld and seal faying surfaces of the first flanges 112a and 122a, and 113a and 123a facing each other, and external recesses 101a and 102a that are formed outside the heat transfer areas 111a and 121a for second fluid passages intersecting with the first fluid passage P1 at a right angle.

Here, the weld lines S2 can be formed by, but not limited to, arc welding in which all or outer ends of the faying surfaces of the first flanges 112a and 122a, and 113a and 123a of the heat transfer plates 110a and 120a contacting each other are fused and joined by a welding electrode. Thus, the weld lines S1 may be formed by another type of welding.

The second flanges 114a and 124a, and 115a and 125a, which are opposite to and spaced apart from each other, define an inlet 131a and an outlet 132a connected with the first fluid passage P1.

Here, the weld lines S2 are formed parallel to the first fluid passage P1, but perpendicular to the external recesses 101a and 102a for the second fluid passages. The inlet 131a and the outlet 132a can be subjected to reversal of their functions according to a direction in which the fluid is fed to the first fluid passage P1.

First slopes 116a and 117a, or 126a and 127a are inclined among the first flanges 112a and 113a, or 122a and 123a, the heat transfer area 111a or 121a, and the second flanges 114a and 115a, or 124a and 125a at a predetermined angle. Further, second slopes 118a and 119a, or 128a and 129a are inclined toward the weld lines S2 between the second flanges 114a and 115a, or 124a and 125a and the heat transfer area 111a or 121a at a predetermined angle, and thus define the external recesses 101a and 102a for the second fluid passages between the second flanges 114a and 115a, or 124a and 125a with a predetermined width.

Further, the first flanges 112a and 122a, and 113a and 123a, between which the inlet 131a and the outlet 132a are formed, have end plates 103a and 104a at left-hand and right-hand ends thereof which are in contact with the second flanges 114a and 124a, or 115a and 125a together with the weld lines S2.

These first and second slopes smoothly convert the flows of the fluids that flow into the first fluid passage and the second fluid passages (in a direction perpendicular to the weld lines S2), exchange heat through the heat transfer areas, and flow out of the first and second fluid passages, thereby inhibiting vortex from being generated.

Thus, the fluid flowing into and out of the first fluid passage and the fluid flowing into and out of the second fluid passages defined by the external recesses undergo minimized vortex, so that a contact area between the fluid in each passage and the heat transfer area 111a or 112a is increased, and thus thermal efficiency can be increased.

FIGS. 6A through 6D illustrate a process of fabricating a heat transfer cell for a heat exchanger according to a second embodiment of the present invention.

As in the first embodiment, the heat transfer plate 11a or 120a according to the second embodiment is fabricated by forming the first flanges 112a and 113a, or 122a and 123a at the upper and lower edges of the heat transfer area 111a or 121a shaped of a quadrilateral panel in a middle region, and by forming the second flanges 114a and 115a, or 124a and 125a at the left-hand and right-hand edges of the heat transfer area 111a or 121a.

When the first and second flanges are formed, both a process of forming first slopes 116a and 117a, or 126a and 127a that are inclined among the first flanges 112a and 113a, or 122a and 123a, the heat transfer area 111a or 121a, and the second flanges 114a and 115a, or 124a and 125a at a predetermined angle and a process of forming second slopes 118a and 119a, or 128a and 129a that are inclined between the second flanges 114a and 115a, or 124a and 125a and the heat transfer area 111a or 121a at a predetermined angle are preformed at the same time. Alternatively, the processes of forming the first and second slopes may be separately performed.

Subsequently, as illustrated in FIG. 6C, the heat transfer plates 110a and 120a are disposed in a mirror image such that a distance between the first flanges 112a and 113a, or 122a and 123a is relatively longer than that between the second flanges 114a and 115a, or 124a and 125a.

In this state, the second flanges 114a and 124a, and 115a and 125a come into surface contact with each other, and then are welded along the outer ends thereof. As a result, as illustrated in FIG. 6D, the outer ends of the second flanges 114a and 124a, and 115a and 125a form the weld lines S2. Further, the inlet 131a and the outlet 132a connected with the first fluid passage P1 are formed between the first flanges 112a and 122a, and 113a and 123a, and the external recesses 101a and 102a for the second fluid passages are formed between the first flanges 112a and 113a, and 122a and 123a. Thereby, the heat transfer cell 100a is fabricated.

Meanwhile, as in the first embodiment, the process of forming the first flanges 112a and 113a, and 122a and 123a and the process of forming the second flanges 114a and 115a, or 124a and 125a can be simultaneously performed. Alternatively, the processes of forming the first and second flanges may be sequentially performed.

Figure 7:
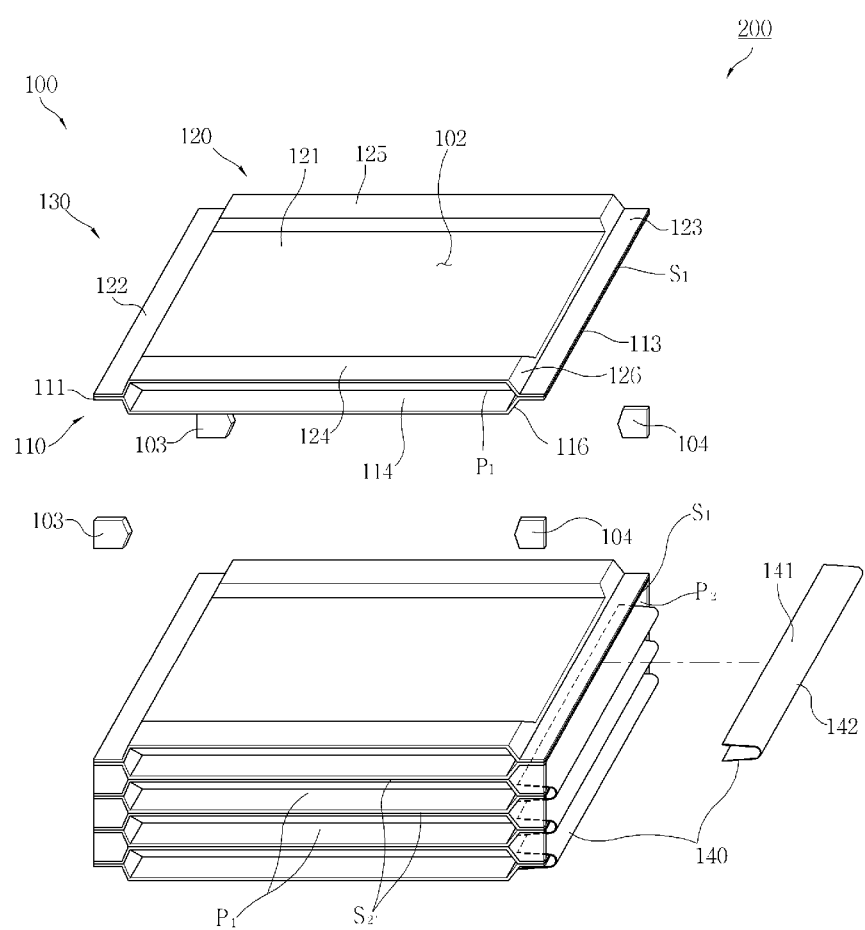
FIG. 7 is a perspective view illustrating a heat transfer assembly for a heat exchanger according to a first embodiment of the present invention.

FIG. 7 is a perspective view illustrating a heat transfer assembly for a heat exchanger according to a first embodiment of the present invention.

As illustrated in FIG. 7, the heat transfer assembly 200 is a hexahedral rigid structure in which two or more heat transfer cells 100, each of which is a unit member fabricated by welding the pair of heat transfer plates 110 and 120 disposed in a mirror image, are stacked.

This heat transfer assembly 200 includes the first fluid passage P1, through which the first fluid flows, in the body of each of the heat transfer cells 100 stacked in multiple layers, and the second fluid passage P2, through which the second fluid flows, between the two neighboring ones of the heat transfer cells 100 stacked in multiple layers.

At this time, the first fluid passage P1 intersects with the second fluid passage P2 at a right angle with the heat transfer area of each heat transfer plate in between without communicating with the second fluid passage P2. Thus, the first and second fluids having different temperatures flow through the heat transfer assembly 200 without being mixed with each other, and thereby exchanging heat with each other through the heat transfer area.

In detail, when the heat transfer cells 100, each of which has the weld lines S1 of the first flanges 112 and 122, and 113 and 123, are stacked in a vertical direction as in FIG. 7, the second flanges 114 and 124, and 115 and 125 intersecting with the first fluid passage P1 of each heat transfer cell 100 are in surface contact with the second flanges 114 and 124, and 115 and 125 of the neighboring heat transfer cell 100, whereas the first flanges 112 and 122, and 113 and 123 are spaced apart from the first flanges 112 and 122, and 113 and 123 of the neighboring heat transfer cell 100.

Thus, the second flanges 114 and 124, and 115 and 125 of the heat transfer cell 100 which are in surface contact with each other, are welded to form other weld lines S2' intersecting with the first fluid passage P1, and the first flanges 112 and 122, and 113 and 123 are welded with the end plates 103 and 104 at the opposite ends of the weld lines S1 thereof. Thereby, the inlet 131 and the outlet 132 of the second fluid passage P2 are formed between the neighboring heat transfer cells 100 by the external recess 101 or 102.

Figure 8:
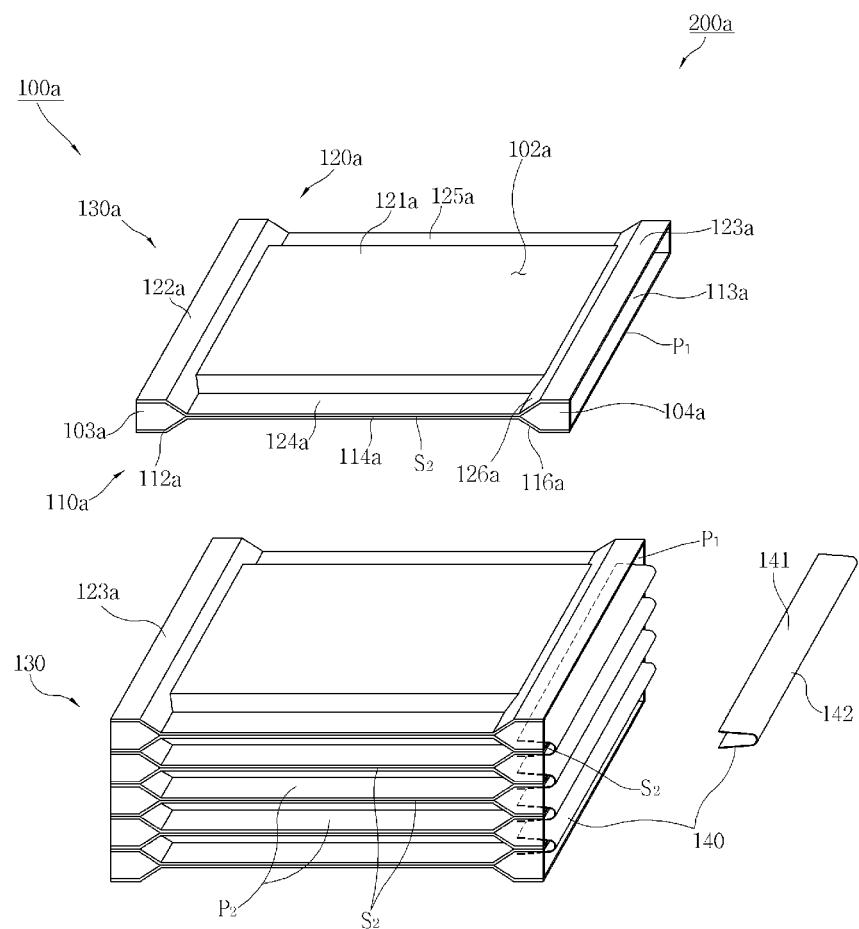
FIG. 8 is an entire perspective view illustrating a heat transfer assembly for a heat exchanger according to a second embodiment of the present invention.

FIG. 8 is an entire perspective view illustrating a heat transfer assembly for a heat exchanger according to a second embodiment of the present invention.

As illustrated in FIG. 8, the heat transfer assembly 200a is a hexahedral rigid structure in which two or more heat transfer cells 100a, each of which is a unit member fabricated by welding the pair of heat transfer plates 110a and 120a disposed in a mirror image, are stacked.

As in the first embodiment, this heat transfer assembly 200a is designed so that the first fluid passage P1 in each of the heat transfer cells 100a stacked in multiple layers and the second fluid passage P2 between the two neighboring ones of the heat transfer cells 100a stacked in multiple layers intersect with each other at a right angle without communicating with each other. Thus, the first and second fluids flowing through the first and second fluid passages of the heat transfer assembly 200a are not mixed with each other, and exchange heat with each other.

This heat transfer assembly 200a includes the first fluid passage P1, through which the first fluid flows, in the body of each of the heat transfer cells 100a stacked in multiple layers, and the second fluid passage P2, through which the second fluid flows, between the two neighboring ones of the heat transfer cells 100a stacked in multiple layers.

At this time, the first fluid passage PI intersects with the second fluid passage P2 at a right angle with the heat transfer area of each heat transfer plate in between without communicating with the second fluid passage P2. Thus, the first and second fluids having different temperatures flow through the heat transfer assembly 200a without being mixed with each other, and thereby exchanging heat with each other through the heat transfer area.

In detail, when the heat transfer cells 100a, each of which has the weld lines S1 of the second flanges 114a and 124a, and 115a and 125a are stacked in a vertical direction as in FIG. 8, the first flanges 112a and 122a, and 113a and 123a intersecting with the first fluid passage P1 of each heat transfer cell 100a are in surface contact with the first flanges 112a and 122a, and 113a and 123a of the neighboring heat transfer cell 100a, whereas the second flanges 114a and 124a, and 115a and 125a are spaced apart from the second flanges 114a and 124a, and 115a and 125a of the neighboring heat transfer cell 100a.

Thus, the first flanges 112a and 122a, and 113a and 123a of the heat transfer cell 100a which are in surface contact with each other, are welded to form other weld lines S2 intersecting with the first fluid passage P1. Thereby, the inlet 131a and the outlet 132a of the second fluid passage P2 are formed between the neighboring heat transfer cells 100a by the external recess 101a or 102a.

Figure 9A:
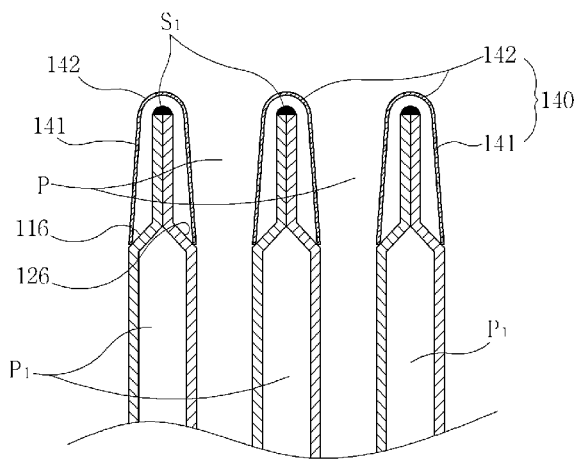
FIGS. 9A and 9B are cross-sectional views illustrating cover members installed on a heat transfer assembly for a heat exchanger according to first and second embodiments of the present invention.
Figure 9B:
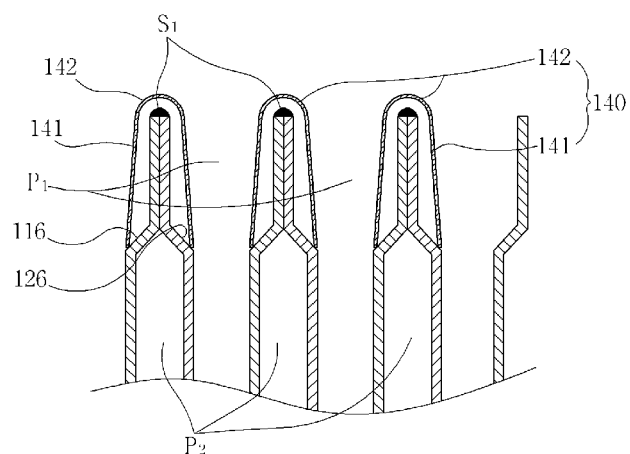

FIGS. 9A and 9B are cross-sectional views illustrating cover members installed on a heat transfer assembly for a heat exchanger according to first and second embodiments of the present invention.

The heat transfer assembly 200 or 200a is provided with cover members 140 on one side thereof, particularly on a side of the inlet of one of the first and second fluid passages P1 and P2, into which the fluid having a relatively lower temperature flows. Each cover member 140 includes a pair of isometric flat sections 141 inclined with respect to the flanges forming the inlet of the second fluid passage by a predetermined angle, and curved sections 142 extending from first ends of the isometric flat sections 141 with a predetermined curvature.

Here, the cover member 140 is open at opposite longitudinal ends thereof, and is preferably formed of a metal sheet in which the isometric flat sections 141 are integrally formed with the curved sections 142. Second ends of the isometric flat sections 141 are fixed to the heat transfer cell, particularly to the slopes that interconnect the flanges and the heat transfer areas of the heat transfer plates. The blind end of the cover member at which the curved sections are connected with each other is spaced apart from the weld line that is formed by welding the flanges by a predetermined distance.

In this manner, the inlet-side flanges are spaced apart from inner surface of the cover member 140, so that an air space filled with air is defined between the inlet-side flanges and the cover member 140. Thus, the fluid having an atmospheric temperature comes into contact with the cover member 140 that is indirectly heated through the air space at a relatively low temperature in its initial stage, instead of contacting the heat transfer plates that are directly heated by the fluid having a relatively high temperature, and thereby is subjected to heat exchange.

In this case, since a temperature difference between the fluid having an atmospheric temperature and the indirectly heated cover member is relatively smaller than that between the fluid having an atmospheric temperature and the directly heated heat transfer plate, it is possible to inhibit moisture from being generated by a sharp temperature difference at the inlet of the fluid passage into the fluid having an atmospheric temperature flows.

Further, the flanges forming the inlet of the fluid passage on which the cover member is installed can be heated within a relatively rapid time to increase its temperature, as compared to the case in which the cover member is not installed.

Figure 10A:
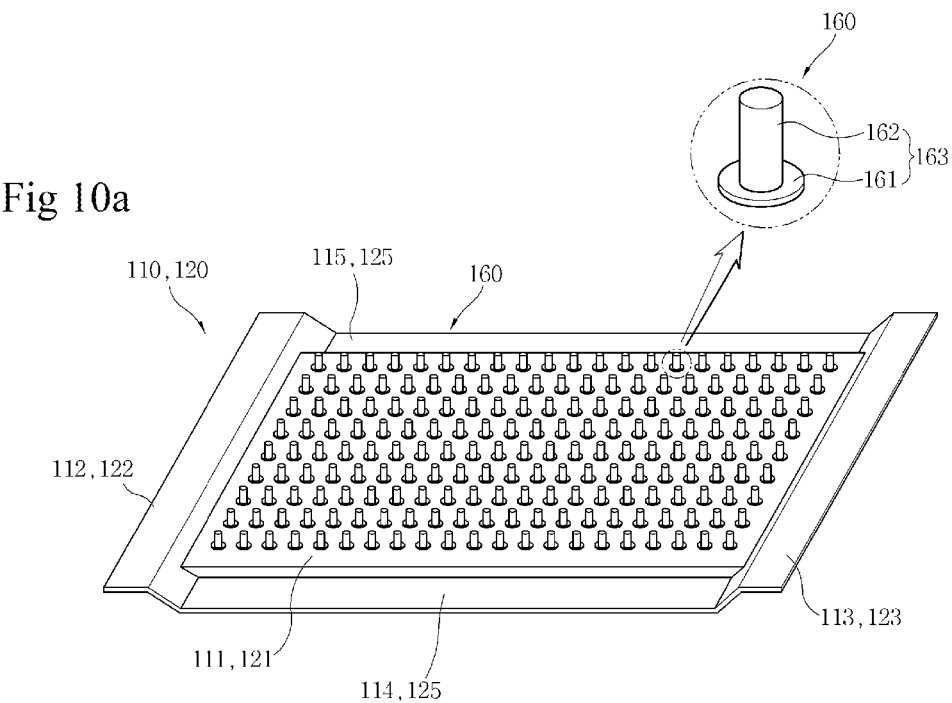
Figure 10B:
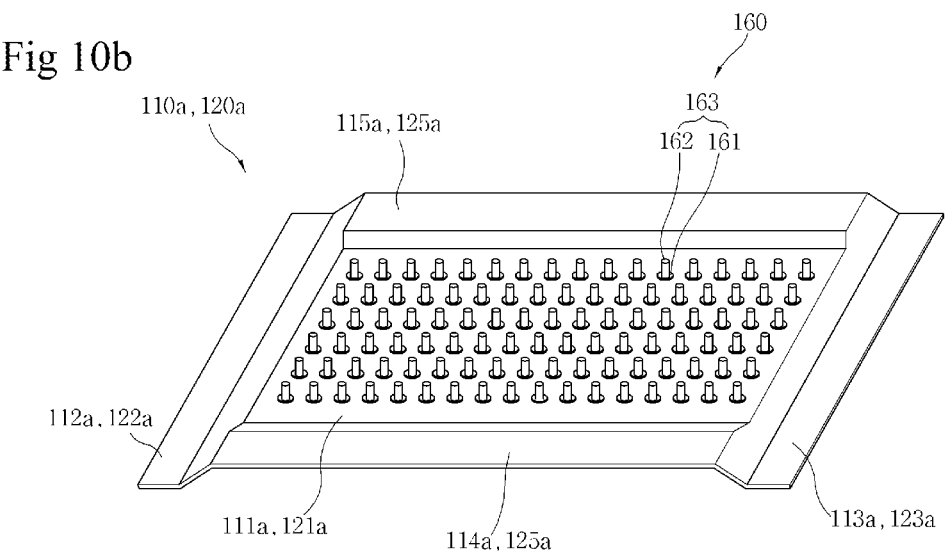
Figure 10C:
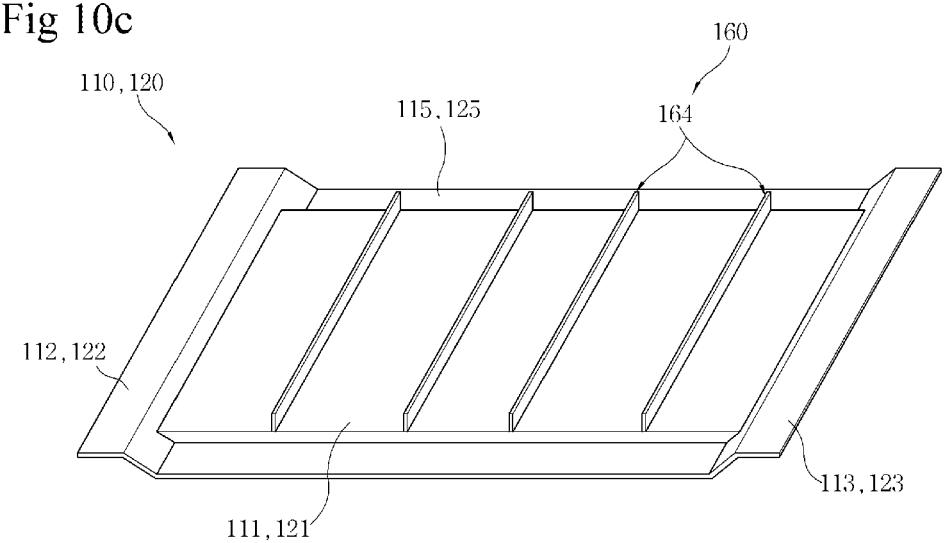
Figure 10D:
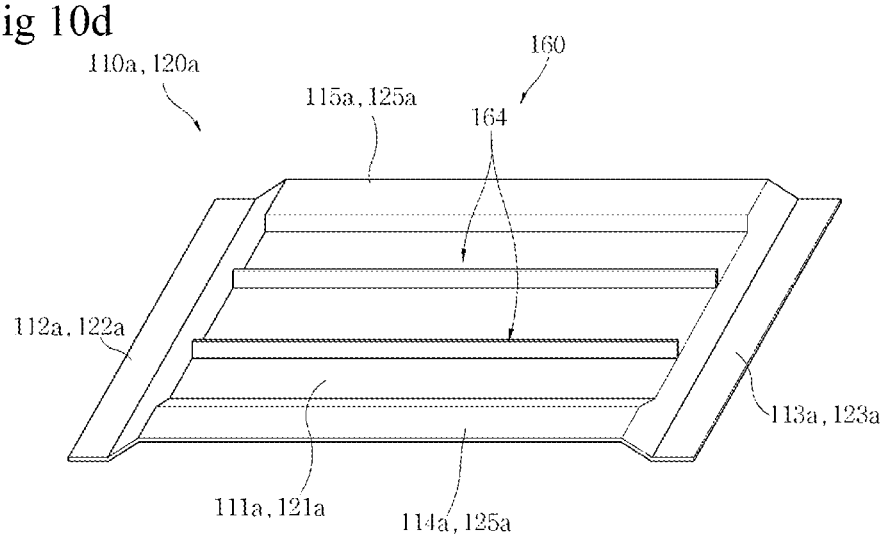
Figure 10E:
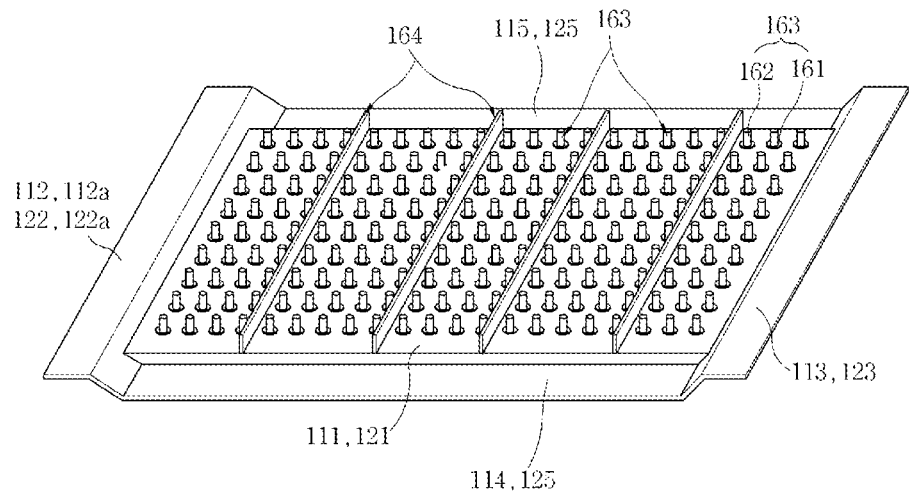
Figure 10F:
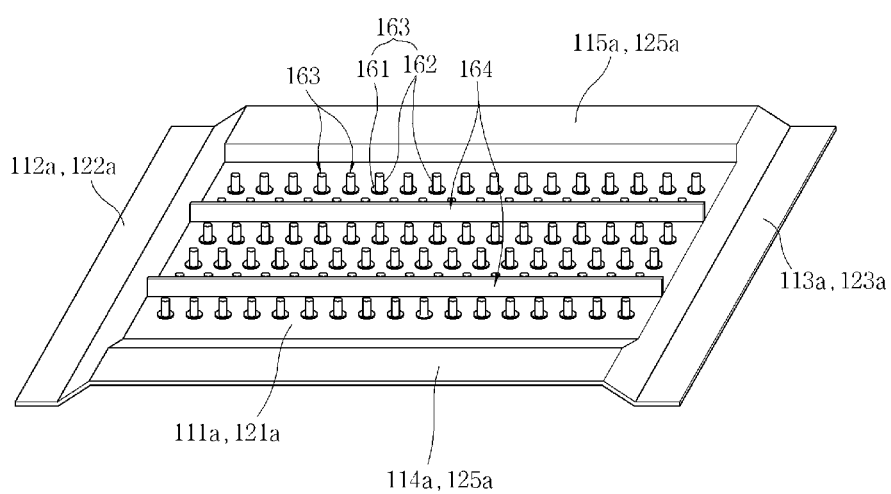

FIGS. 10A through 10F are perspective views illustrating a set of spacers installed on a heat transfer cell for a heat exchanger according to first and second embodiments of the present invention, wherein FIGS. 10A and 10B are for a stud type, FIGS. 10C and 10D are for a strip type, and FIGS. 10B and 10F are for a mixed type.

As illustrated in FIGS. 10A through 10F, the heat transfer cell 100 or 100a includes a spacer set 160, which has a height equal to or less than an interval between the two neighboring heat transfer areas 111 and 121, or 111a and 121a so as to be able to constantly maintain an interval of the first fluid passage P1 formed between the two neighboring heat transfer plates 110 and 120, or 110a and 120a that are welded opposite to each other in a mirror image.

The spacer set 160 allows the interval between the heat transfer areas of the heat transfer plates 110 and 120, or 110a and 120a opposite to each other to be maintained as a design value so as not only to prevent welding defects generated when the heat transfer plates 110 and 120, or 110a and 120a disposed in a horizontal direction are subjected to sag at the central regions thereof due to their own weights in the process of fabricating the heat transfer assembly 200 or 200a by stacking the heat transfer cells 100 or 100a in a vertical direction and by welding the flanges of the heat transfer cells 100 or 100a which are in contact with each other but also to form the first fluid passage.

This is because opposite ends of the spacer set 160 are in contact with the heat transfer areas 111 and 121, or 111a and 121a of the neighboring heat transfer plates 110 and 120, or 110a and 120a, and thus prevent excessive downward sagging.

Accordingly, the process of welding the flanges of the heat transfer cells 100 or 100a staked in a vertical direction in order to assemble the heat transfer assembly 200 or 200a can be more precisely performed without a flaw or defect, and prevent deformation of the heat transfer assembly 200 or 200a.

As illustrated in FIGS. 10A and 10B, the spacer set 160 includes a plurality of stud spacers 163, a lower end of each of which is welded to the heat transfer area 111 or 111a, or 121 or 121a so as to intersect with the heat transfer area 111 or 111a, or 121 or 121a at a right angle. Each stud spacer 163 includes a weld strap 161 fixed to the heat transfer area 111 or 111a, or 121 or 121a by spot welding, and a support stud 162 vertically extending from the top of the weld strap 161.

Here, the stud spacers 163 must be arranged in rows and columns so as to be able to minimize friction loss of the fluid flowing through the first fluid passage. In consideration of the downward sagging that occurs to a relatively higher level on the central region of each heat transfer area as compared to the edge region of each heat transfer area, an interval between the neighboring stud spacers 163 on the central region of each heat transfer area may be set to be narrower than that on the edge region of each heat transfer area.

Further, the support stud 162 is shown to have, but not limited to, a cylindrical shape. Thus, the support stud 162 may have an oval cross section or an angled cross section.

As illustrated in FIGS. 10C and 10D, the spacer set 160 includes a plurality of strip spacers 164, a lower end of each of which is welded to the heat transfer area 111 or 111a, or 121 or 121a so as to intersect with the heat transfer area 111 or 111a, or 121 or 121a at a right angle, and each of which extends in a flow direction of the fluid at a predetermined length.

Here, in consideration of the downward sagging, an interval between the neighboring strip spacers 164 on the central region of each heat transfer area may be set to be narrower than that on the edge region of each heat transfer area.

As illustrated in FIGS. 10E and 10F, the spacer set 160 includes a plurality of stud spacers 163, a lower end of each of which is welded to the heat transfer area 111 or 111a, or 121 or 121a so as to intersect with the heat transfer area 111 or 111a, or 121 or 121a at a right angle, and a plurality of strip spacers 164, a lower end of each of which is welded to the heat transfer area 111 or 111a, or 121 or 121a so as to intersect with the heat transfer area 111 or 111a, or 121 or 121a at a right angle, and each of which extends in a flow direction of the fluid at a predetermined length, wherein the stud spacers 163 are mixed with the strip spacers 164.

Figure 11:
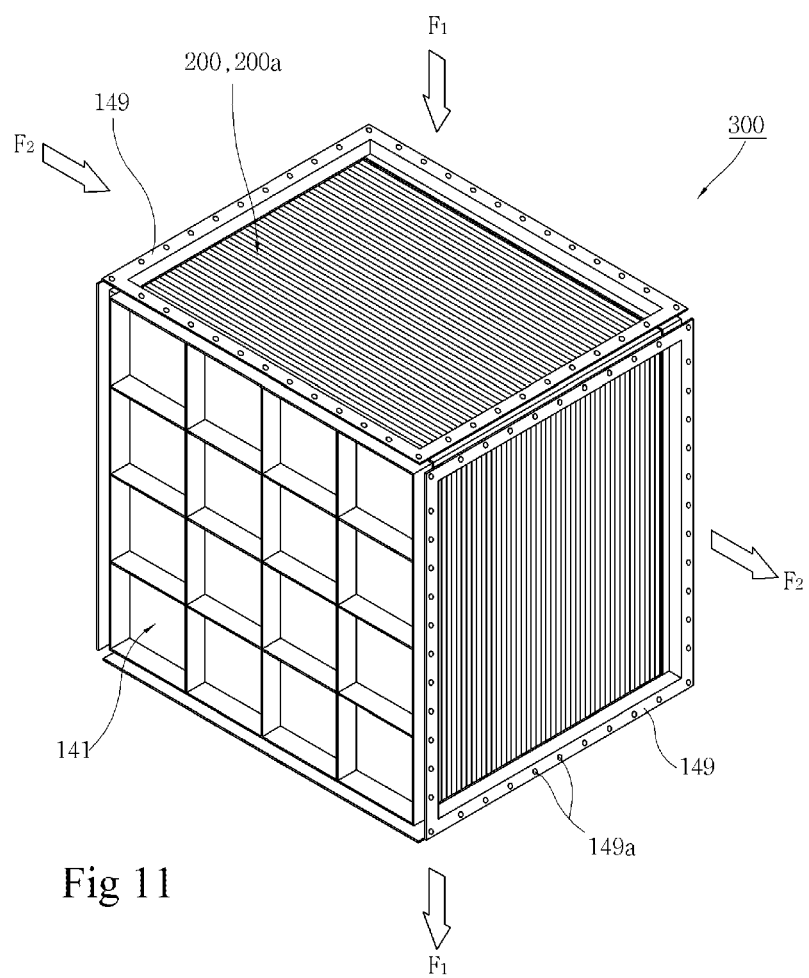
FIG. 11 is a perspective view illustrating a heat exchanger to which a heat transfer cell or a heat transfer assembly according to an embodiment of the present invention is applied.

FIG. 11 is a perspective view illustrating a heat exchanger to which a heat transfer cell or a heat transfer assembly according to an embodiment of the present invention is applied. This heat exchanger 300 includes a pair of sealing plates 141 so as to be in contact with or spaced from apart from the opposite left-hand and right-hand sides of the heat transfer assembly 200 or 200a in which at least two heat transfer cells are stacked in multiple layers. When viewed from FIG. 11, the heat exchanger 300 has an inlet into which a first fluid F1 flows and an outlet out of which the first fluid F1 flows on upper and lower faces thereof, and another inlet into which a second fluid F2 flows and another outlet out of which the second fluid F2 flows on front and rear faces thereof.

In detail, as illustrated in FIG. 11, among the first and second fluids having different temperatures, the first fluid having an atmospheric temperature is designed to flow from the top to the bottom through the fluid passage formed in the body of the heat transfer cell 100 or 100a when vertically flowing through the heat transfer assembly 200 or 200a, whereas the second fluid having a relatively higher temperature is designed to flow from the front to the rear through the other fluid passage formed between the neighboring heat transfer cells 100 or 100a when horizontally flowing through the heat transfer assembly 200 or 200a. However, the embodiment is not limited to this configuration. Thus, the first and second fluids may flow in opposite directions.

Accordingly, the first and second fluids fed to the heat transfer assembly 200 or 200a exchange heat with each other while flowing through the passages that intersect with each other at a right angle without communicating with each other. At this time, the fluid having an atmospheric temperature is converted into a high-temperature fluid, and then is discharged to the outside, while the other fluid recollects waste heat, is converted into a low-temperature fluid, and is discharged to the outside.

Here, one of the first and second fluid includes air having an atmospheric temperature, and the other fluid includes waste gas, exhaust gas, or the like that is discharged from the industrial field and has a relatively higher temperature.

The heat exchanger 300 includes joint quadrilateral frames 149 having a plurality of fastening holes 149a at the inlets and outlets for the first and second fluids, so that the plurality of heat exchangers 300 can be continuously connected in the flow direction of the first or second fluid by means of the joint quadrilateral frames 149.

While the present invention has been shown and described in connection with the exemplary embodiments, it will be apparent to those skilled in the art that modifications and variations can be made without departing from the spirit and scope of the invention as defined by the appended claims.

What is claimed is:

1. A heat transfer assembly for a heat exchanger, the heat transfer assembly comprising a plate stack defining first fluid passages that intersect second fluid passages at right angles, said first and second fluid passages each defining an inlet and an outlet being adapted to accommodate fluids with different temperatures and to allow said fluids to mutually exchange heat while flowing through the first and second fluid passages, wherein the plate stack comprises:

a first heat transfer plate having a first heat transfer area with a shape of a planar quadrilateral panel, and a pair of first flanges where each first flange is bent from the first heat transfer area so as to define a height difference between the first heat transfer area and the pair of first flanges in a first direction such that each first flange is interconnected to the first heat transfer area by a first slope portion;

a second heat transfer plate having a second heat transfer area a shape of a planar quadrilateral panel, and a pair of further first flanges where each further first flange is bent from the second heat transfer area in a second direction opposite to the first direction so as to define a height difference between the second heat transfer area and the pair of further first flanges such that each further first flange is interconnected to the second heat transfer area by a further first slope portion;

wherein the first and second heat transfer plates are joined in a mirror-symmetric arrangement along the first and further first flanges, with the first and further first slope portions located at an inlet of one of the first and second fluid passages;

wherein the heat transfer assembly comprises at least one cover member installed at the inlet of one of the first and second fluid passages, said cover member including a pair of isometric flat sections that are inclined at respective non-zero angles relative to the first and further first flanges at the inlet of one of the first and second fluid passages, and a curved section interconnecting the isometric flat sections, the isometric flat sections and curved section jointly defining an inner surface of the cover member, and wherein the isometric flat portions are respectively fixed relative to said first and further first slope portions such that the inner surface of the cover member is spaced apart from and faces the first and further first flanges and at least part of the first and further first slope portions.

2. The heat transfer assembly of claim 1, wherein the first flanges are bent in a same direction from opposite edges of the first heat transfer area, and extend parallel thereto;

wherein the further first flanges are bent in a same direction from opposite edges of the second heat transfer area, and extend parallel thereto;

wherein the first heat transfer plate further comprises a pair of second flanges bent from further opposite edges of the first heat transfer area, so as to extend parallel and at a height difference with respect to the first heat transfer area;

and wherein the second heat transfer plate comprises a pair of further second flanges bent from further opposite edges of the second heat transfer area, so as to extend parallel and at a height difference with respect to said second heat transfer area.

3. The heat transfer assembly of claim 2, wherein the plate stack includes weld lines formed along the first and further first flanges that are opposite to and in contact with each other, and wherein the inlet of one of the first and second fluid passages is connected via one of the first and second fluid passages with an outlet, the inlet and outlet of one of the first and second fluid passages being defined by the second and further second flanges that are opposite to and spaced apart from each other.

4. The heat transfer assembly of claim 1, wherein the first slope portions extend from the first heat transfer area and are inclined at an obtuse angle toward the first flange at the inlet of one of the first and second fluid passages, and wherein the further first slopes portions extend from the second heat transfer area and are inclined at an obtuse angle toward the further first flange at the inlet of one of the first and second fluid passages.

5. The heat transfer assembly of claim 1, wherein the plate stack includes separate polygonal end plates, each said end plate being fixed to and along the first and further first flanges and the first and further first slope portions, so that said end plates and said first and further first flanges jointly outline the inlet of one of the first and second fluid passages.

6. The heat transfer assembly of claim 1, wherein the plate stack includes second slope portions that extend from the first heat transfer area and are inclined at obtuse angles toward second flanges, and further second slope portions that extend from the second heat transfer area and are inclined at obtuse angles toward further second flanges.

7. The heat transfer assembly of claim 1, wherein the plate stack further includes a spacer set that maintains a height of the first fluid passage between the first and second heat transfer areas.

8. The heat transfer assembly of claim 7, wherein the spacer set includes a plurality of stud spacers, a lower end of each of which is fixed to one of the first and second heat transfer areas so as to intersect with one of the first and second heat transfer areas at a right angle.

9. The heat transfer assembly of claim 7, wherein the spacer set includes a plurality of strip spacers, a lower end of each of which is fixed to one of the first and second heat transfer areas so as to intersect with one of the first and second heat transfer areas at approximately a right angle, and each of which extends in a flow direction of a fluid at a predetermined length.

10. The heat transfer assembly of claim 7, wherein the spacer set includes a plurality of stud spacers, a lower end of each of which is fixed to one of the first and second heat transfer areas so as to intersect with one of the first and second heat transfer areas at approximately a right angle, and a plurality of strip spacers, a lower end of each of which is fixed to one of the first and second heat transfer areas so as to intersect with one of the first and second heat transfer areas at approximately a right angle and each of which extends in a flow direction of the fluid at a predetermined length.

11. The heat transfer assembly of claim 1, wherein said at least one cover member is formed of a metal sheet in which the isometric flat sections are integrally formed with the curved section.

12. The heat transfer assembly of claim 1, wherein a space filled with air is defined between the inner surface of the cover member and one of the first and one of the further first flanges and at least part of the first and further first slope portions.

* * * * *